May 7, 1957
J. GRONEK
2,791,054
FISHING LINE SUPPORTING CLIPS
Filed May 20, 1954
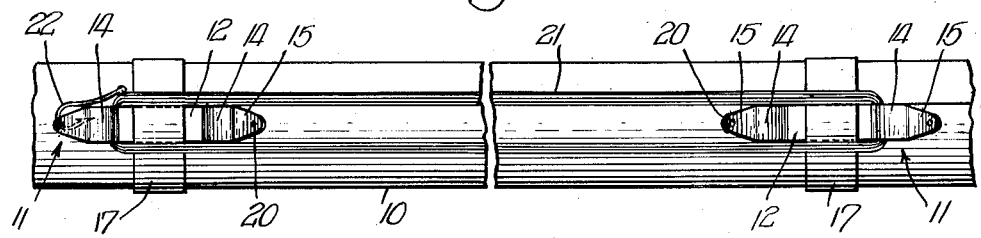
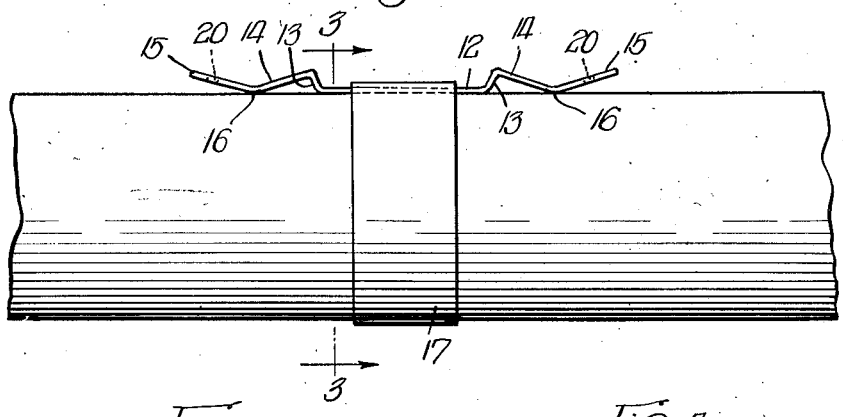
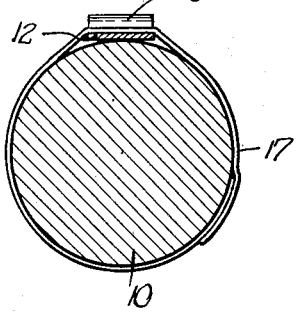 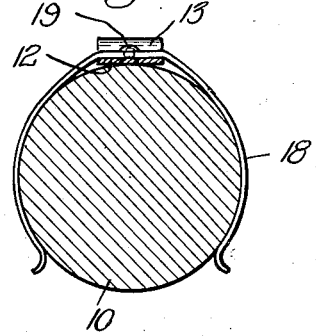
INVENTOR.
John Gronek,
BY

2,791,054

FISHING LINE SUPPORTING CLIPS

John Gronek, Chicago, Ill.

Application May 20, 1954, Serial No. 431,047

3 Claims. (Cl. 43—25.2)

The present invention relates to fishing line clips.

The principal object of the present invention is the provision of a suitable fishing line clip, a pair of which may be attachable or rigidly supportable upon fishing pole, rod or any other support, for looping therearound a fishing line for rendering the same wound in an orderly manner, readily available for use, or for the purpose of drying the same.

Another object of the present invention is the provision of a clip for the purpose hereinabove indicated which may be easily struck out from a rigid sheet of material such as metal, plastic or the like.

With the above general objects in view and others that will appear as the invention is better understood, the same consists in the novel construction, combination and arrangement of parts hereinafter more fully described, illustrated in the accompanying drawings and pointed out in the appended claims.

In the drawing forming a part of this application and in which like designating characters refer to corresponding parts throughout the several views:

Fig. 1 is an elevation view of a fishing pole or the like, with a pair of the present clips, arranged in a longitudinal mutual relation shown in a plan view, and attached to the fishing pole or the like, with a fishing line looped or strung therearound;

Fig. 2 is an enlarged elevational view of the fishing pole or the like, with an enlarged side elevational view of a single clip in an operative position upon the fishing pole or the like;

Fig. 3 is a cross sectional view on line 3—3 of Fig. 2; and

Fig. 4 is a similar view illustrating an additional mode of attaching the clip to the fishing pole or the like.

Referring in detail to the present drawing there is shown a fishing pole, rod or any other oblong support 10. The clip, generally indicated by 11, in Fig. 1, includes shank 12, from each end of which arm 13 projects at an obtuse angle thereto. Projecting from each arm 13 in a downward direction is extension 14, and from it an upwardly directed tongue 15 extends. It is noted that corner 16 effected by each extension 14 and tongue 15 is on the same plane as shank 12 in order that the same may be in contact with the fishing pole or like support 10 when the clip remains in an operative position therewith, as best shown in Fig. 2. In the manufactured clip 11, before the same is applied to support 10 corners 16 thereof may be actually below the plane of shank 12 in order that said corners 16 may exert a strong contactual pressure against support 10 when shank 12 and the clip remain in a contactual operative relation with the support. This result will be facilitated by the inherent resilient nature of the clip.

When the clip is laid upon the fishing pole or like support 10 in a longitudinal relation therewith, a band 17 of cellophane tape such as Scotch tape or the like is wound around said support 10 and shank 12 for the purpose of maintaining clip 11 in a strong contactual engagement with support 10, with contacts 16 firmly pressed thereagainst.

As shown in Fig. 4 band 17 may be substituted for by a suitable clamp 18, the central portion of which is riveted at 19 to shank 12, with the jaws of said clamp 18 extending in an embracing relation throughout the major peripheral portion of support 10.

Optionally tongues 15 at their outer ends may be provided with apertures 20.

A pair of said clips 11, as seen in Fig 1, is used to string or loop therearound fishing line 21. While winding the fishing line around the clips the line is passed under tongues 15 and then forced under corners 16 adjacent the outermost ends in a pair of said clips 11, as the fishing line is successively looped around the pair of said clips 11. Once the portion of the fishing line has passed corner 16, the line will find itself within the space defined by arm 13, extension 14 and the adjacent portion of support 10. The arm 13 prevents further shifting movement of the fishing line and defines a stop for that purpose. It is noted that for the purpose of looping or stringing the fishing line only the outermost ends of the clips in a pair thereof have an operative function.

It is observed that the two clips may be placed as near to each other or as far from each other as may be desired. Apertures 20 at the ends of tongues 15 are for reception of the barbed end of fishing hooks 22, as seen in Fig. 1. The leader of the hook may be tucked under the strands of the fishing line intermediately of clips 11 in order that the leader may dry while in a stretched condition and thereby preventing kinking thereof.

What I claim as new is:

1. In a fishing apparatus for a fishing pole having a line connected thereto the improvement which comprises a pair of holding elements, each adapted to be separately slidably mounted on a fishing pole, each element having a shank, clips on opposite ends of the shank, said shank having a circumferential member medially attached thereover adapted to clamp the shank about the pole, said shank adapted to extend along said pole in contact therewith, each clip having a straight portion extending from an end of said shank at an obtuse angle thereto, a straight extension extending right angularly from one end of said portion adapted to extend back to said pole so as to form with said portion and said pole a closed pocket for the reception of a fishing line and a straight tongue extending angularly from the extension away from said pole, said clips being adapted to be disposed so that the tongues thereof extend in the same general direction from the shank whereby a fishing line may be wrapped around and around said pair of holding elements with portions of each of the convolutions thereof being disposed in the pockets formed by the portions and extensions of said clips, whereby the line may be positioned between the tongue of each clip and the pole and slid to a position to engage the first-mentioned portion to retain the line in secured position to the pole.

2. In a fishing apparatus for a fishing pole having a line connected thereto the improvement which comprises a pair of holding elements, each adapted to be separately mounted on the fishing pole, each element having a shank, clips on opposite ends of the shank, said shank having a circumferential band of cellophane tape attached thereover adapted to clamp the shank about the pole, said shank adapted to extend along said pole in contact therewith, each clip having a straight portion extending from an end of said shank at an obtuse angle thereto, a straight extension extending right angularly from one end of said portion back to said pole so as to form with said portion and said pole a closed pocket for the reception of a fishing line and a straight tongue extending angularly from the extension away from said pole, said clips being disposed so that certain of the tongues thereof extend in opposite directions away from each other, each of the parts of each clip being adapted to extend in the same general direction from the shank, whereby a fishing line may be wrapped around and around said pair of holding elements with portions of each of the convolutions thereof being disposed in the pockets formed by certain of the portions and extensions of said clips, whereby the line may be positioned between a tongue of each clip and the pole and slid to a position to engage the first-mentioned portion to retain the line in secured position to the pole.

3. In a fishing apparatus as set forth in claim 2, each said tongue having an aperture therein for the reception of the barbed end of a fish hook, the leader of the hook being adapted to be tucked under the strands of the fishing line to dry in a stretched condition thereby preventing kinking thereof.

References Cited in the file of this patent

UNITED STATES PATENTS

| | | |
|---|---|---|
| 468,227 | Pflueger | Feb. 2, 1892 |
| 502,427 | Zangenberg | Aug. 1, 1893 |
| 657,786 | Plumley | Sept. 11, 1900 |
| 1,062,726 | Nelson | May 27, 1913 |
| 2,185,507 | Knapp | Jan. 2, 1940 |
| 2,222,096 | Walthour | Nov. 19, 1940 |
| 2,280,759 | Kruse | Apr. 21, 1942 |
| 2,563,560 | Stafford | Aug. 7, 1951 |
| 2,584,430 | Dayton et al. | Feb. 5, 1952 |

FOREIGN PATENTS

| | | |
|---|---|---|
| 77,882 | Sweden | 1933 |